(12) United States Patent
Geldman

(10) Patent No.: US 11,880,734 B2
(45) Date of Patent: Jan. 23, 2024

(54) WIRELESS TAG TESTING

(71) Applicant: Wiliot, Ltd., Caesarea (IL)

(72) Inventor: Ido Geldman, Tel Aviv (IL)

(73) Assignee: WILIOT, LTD., Caesarea (IL)

( * ) Notice: Subject to any disclaimer, the term of this patent is extended or adjusted under 35 U.S.C. 154(b) by 0 days.

(21) Appl. No.: 17/804,734

(22) Filed: May 31, 2022

(65) Prior Publication Data

US 2023/0394252 A1 Dec. 7, 2023

(51) Int. Cl.
*G06K 7/00* (2006.01)

(52) U.S. Cl.
CPC ............ *G06K 7/0095* (2013.01); *G06K 7/00* (2013.01); *G06K 7/0008* (2013.01)

(58) Field of Classification Search
CPC ...... G06K 7/00; G06K 7/0008; G06K 7/0095; G06K 7/10; G06K 7/10019; G06K 7/14; H04Q 7/00; H04Q 7/06; H04Q 5/22; H04L 12/40; H04L 29/12
See application file for complete search history.

(56) References Cited

U.S. PATENT DOCUMENTS

| | | | |
|---|---|---|---|
| 5,294,931 A | 3/1994 | Meier | |
| 6,035,677 A | 3/2000 | Janssen et al. | |
| 6,104,291 A | 8/2000 | Beauvillier et al. | |
| 6,184,777 B1 | 2/2001 | Mejia | |
| 6,459,282 B1 | 10/2002 | Nakamura | |
| 6,553,013 B1 * | 4/2003 | Jones | G01S 15/876 370/328 |
| 6,650,228 B1 * | 11/2003 | Vacherand | G06K 7/10019 340/10.2 |
| 6,946,950 B1 | 9/2005 | Ueno et al. | |
| 7,102,517 B2 | 9/2006 | Reyes et al. | |
| 7,164,353 B2 | 1/2007 | Puleston et al. | |
| 7,178,416 B2 | 2/2007 | Whelan et al. | |
| 7,225,992 B2 | 6/2007 | Forster | |
| 7,279,920 B2 | 10/2007 | Kramer | |
| 7,400,255 B2 | 7/2008 | Horch | |
| 7,477,152 B2 | 1/2009 | Forster | |
| 7,528,724 B2 | 5/2009 | Horch | |
| 7,604,177 B2 | 10/2009 | Konuma et al. | |
| 8,010,219 B2 | 8/2011 | Martinez et al. | |
| 8,627,170 B2 | 1/2014 | Ito et al. | |

(Continued)

OTHER PUBLICATIONS

NPL Search (Apr. 24, 2023).*

(Continued)

*Primary Examiner* — Van T Trieu
(74) *Attorney, Agent, or Firm* — M&B IP Analysts, LLC

(57) ABSTRACT

A method for testing wireless tags by a testing unit, comprising: transmitting a signal to energize a plurality of wireless tags within a testing area of the testing unit substantially simultaneously; waiting a prescribed amount of time sufficient to allow all of the wireless tags in the testing area an opportunity to respond with a transmitted message, each transmitted message including a unique identifier of the wireless tag; determining, based on information as to the identity of which wireless tags are in the testing area and receipt, if any, by the tester of the transmitted messages containing respective unique identifiers from the wireless tags in the testing area, which of the plurality of wireless tags are good and which of the plurality of wireless tags are bad.

22 Claims, 8 Drawing Sheets

(56) References Cited

U.S. PATENT DOCUMENTS

| | | |
|---|---|---|
| 9,016,585 B2 | 4/2015 | Pavate et al. |
| 9,159,012 B2 | 10/2015 | Downie et al. |
| 9,432,132 B2 | 8/2016 | Tuominen |
| 10,158,401 B2 | 12/2018 | Hull et al. |
| 10,720,036 B2 | 7/2020 | Ellers et al. |
| 2002/0120302 A1 | 8/2002 | Lyden |
| 2005/0052287 A1 | 3/2005 | Whitesmith et al. |
| 2005/0223286 A1 | 10/2005 | Forster |
| 2005/0242921 A1 | 11/2005 | Zimmerman et al. |
| 2005/0252979 A1 | 11/2005 | Konuma et al. |
| 2005/0271416 A1 | 12/2005 | Kinoshita et al. |
| 2006/0012387 A1 | 1/2006 | Shanks |
| 2006/0093312 A1 | 5/2006 | Park et al. |
| 2006/0125505 A1 | 6/2006 | Glidden et al. |
| 2006/0202831 A1 | 9/2006 | Horch |
| 2006/0206277 A1 | 9/2006 | Horch |
| 2007/0213951 A1 | 9/2007 | Eeden |
| 2007/0220737 A1 | 9/2007 | Stoughton et al. |
| 2009/0085589 A1 | 4/2009 | Hsieh et al. |
| 2009/0184165 A1 | 7/2009 | Bertness et al. |
| 2010/0207729 A1 | 8/2010 | Ko et al. |
| 2010/0214080 A1 | 8/2010 | Alexis |
| 2011/0052792 A1 | 3/2011 | Shin |
| 2011/0074582 A1 | 3/2011 | Alexis |
| 2012/0019363 A1* | 1/2012 | Fein ............... G06K 19/07767 340/10.1 |
| 2012/0068829 A1* | 3/2012 | Shi .................. G06K 7/10019 340/10.2 |
| 2012/0193433 A1 | 8/2012 | Chang et al. |
| 2012/0274448 A1 | 11/2012 | Marcus et al. |
| 2013/0342323 A1 | 12/2013 | Hinman et al. |
| 2014/0145749 A1 | 5/2014 | Lee et al. |
| 2015/0015366 A1 | 1/2015 | Hoffman |
| 2015/0056918 A1 | 2/2015 | Tuominen |
| 2016/0284185 A1 | 9/2016 | Maison et al. |
| 2017/0116443 A1 | 4/2017 | Bolic et al. |
| 2017/0206367 A1* | 7/2017 | Six .............................. G07C 1/22 |
| 2017/0222828 A1* | 8/2017 | Six .......................... H04L 61/5038 |
| 2018/0121690 A1 | 5/2018 | Forster et al. |
| 2018/0137316 A1 | 5/2018 | Fischer |
| 2018/0225486 A1 | 8/2018 | Teruyama |
| 2018/0341840 A1 | 11/2018 | Uemura et al. |
| 2019/0118382 A1 | 4/2019 | Gu et al. |
| 2019/0147646 A1 | 5/2019 | Fan et al. |
| 2019/0156170 A1 | 5/2019 | Aguirrezabalaga et al. |

OTHER PUBLICATIONS

International Search Report; PCT/IB2023/054947; Israel Patent Office, Jerusalem. dated Jul. 18, 2023.

Written Opinion of the International Searching Authority; PCT/IB2023/054947. Israel Patent Office, Jerusalem. dated Jul. 18, 2023.

* cited by examiner

WIRELESS TAG TESTING

TECHNICAL FIELD

The present disclosure relates to the testing of wireless tags, such as Bluetooth wireless tags, to ensure that they are not defective and thus suitable for deployment.

BACKGROUND

Testing wireless tags, which is done one wireless tag at a time, is time consuming. Typically, full functionality of the wireless tag, i.e., the full system path of the wireless tag, is tested. Some wireless tags may be designed to harvest electromagnetic energy at one or more frequencies to provide power for their operations. Each such harvesting wireless tag is charged as it arrives at the testing area and then each wireless tag is fully tested. Such testing requires a start and stop process for the conveyance of the wireless tags so that they are in the testing area long enough to be tested.

In various prior art testing arrangements, the testing area may, but need not, be within a chamber that is isolated at least in part from other radio waves. Regardless of whether or not the testing area is a chamber, it is necessary for the wireless tag to be within the testing area of the testing arrangement for a sufficient amount of time to charge and fully test the wireless tag.

Another similar testing regime uses a far field antenna to charge each wireless tag but then each wireless tag is fully tested using a near field antenna. Again, such testing requires a start and stop process for the conveyance of the wireless tags so that each wireless tag is stopped in the testing area of the testing arrangement, and in particular within the range of the near field antenna, for a sufficient amount of time to perform the testing.

A further issue with testing is that some types of wireless tags may be expected to be able to communicate on multiple frequencies. However, before a wireless tag is "converted" it may only be able to communicate on a limited set of the frequencies on which it is expected to ultimately be able to communicate. Conversion is a process by which additional layers are added to the wireless tag which can change the characteristics of the wireless tag's antenna. In view of the foregoing, testing is typically done after conversion and on multiple ones of the wireless tag's expected frequencies of communication.

Prior art wireless tag testing takes hundreds of milliseconds to few seconds per wireless tag. It would be advantageous to provide a solution that speeds up the wireless tag testing property.

SUMMARY

The embodiments disclosed herein are only examples of the many possible advantageous uses and implementations of the innovative teachings presented herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

Certain embodiments disclosed herein include a method for testing wireless tags by a testing unit. The method comprises: transmitting a signal to energize a plurality of wireless tags within a testing area of the testing unit substantially simultaneously; waiting a prescribed amount of time sufficient to allow all of the wireless tags in the testing area an opportunity to respond with a transmitted message, each transmitted message including a unique identifier of the wireless tag; determining, based on information as to the identity of which wireless tags are in the testing area and receipt, if any, by the tester of the transmitted messages containing respective unique identifiers from the wireless tags in the testing area, which of the plurality of wireless tags are good and which of the plurality of wireless tags are bad.

Certain embodiments disclosed herein include a method for testing wireless tags by a testing unit, comprising: determining which, if any, of a plurality of wireless tags in a testing area are good based on received responses from none or more of the wireless tags of the plurality in response to an energizing signal transmitted in the testing area and knowledge of which wireless tags make up the plurality of wireless tags in the testing area.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality.

Unless otherwise explicitly specified herein, the drawings are not drawn to scale.

In the description, identically numbered components within different ones of the FIGs. refer to components that are substantially the same.

Disclosed herein is a method and system for rapidly testing several wireless tags in a matrix in a short period of time. The method effectively involves two phases. In the first phase, it is determined which wireless tags are under test. In the second phase, the wireless tags are energized and wireless tags that are known to be under test but don't respond are declared bad while all the remaining wireless tags under test are declared good.

More specifically, the wireless tags may be arranged in a one- or two-dimensional matrix and located simultaneously in a testing area. Because the location of each wireless tag within the matrix is known, it is known which wireless tags are in the testing area. The wireless tags in the testing area are charged and perform their respective calibrations at the same time. Due to the nature of the wireless protocol, e.g., a clear to transmit or a transmit and test protocol, e.g., an ALOHA-type protocol, eventually all of the wireless tags that are operational will transmit a signal that includes a unique identifier (ID) for the wireless tag. The tester receives such transmitted signals. Since the tester knows which wireless tags are in the testing area and what their respective IDs are, any wireless tag from which the tester does not receive a signal including its ID will be determined to be bad. The remaining wireless tags for which a signal is received will be determined to be in good condition and to have passed the testing.

Figure 1:
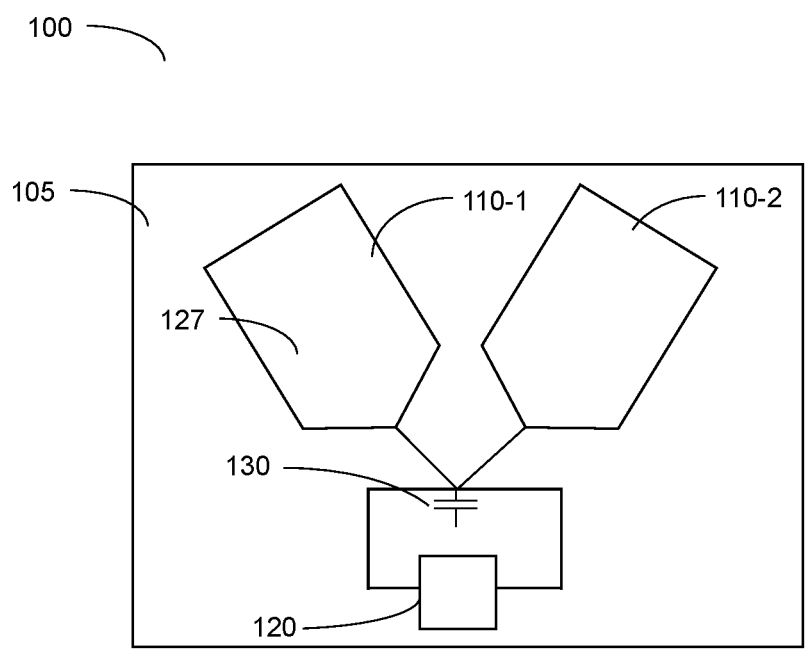
FIG. 1 shows a schematic diagram of an illustrative wireless tag, e.g., an Internet of Things (IoT) wireless tag, that may be utilized with the various embodiments for testing wireless tags.

FIG. 1 is a schematic diagram of illustrative wireless tag 100, e.g., an Internet of Things (IoT) wireless tag, that may be utilized with the various embodiments for testing wireless tags. Wireless tag 100 includes an integrated circuit (IC or chip) 120 and at least one antenna, e.g., antennas 110-1, 110-2, placed on an inlay 105. In an embodiment, the inlay 105 is a single layer inlay that includes the integrated circuit 120 connected to the at least one antenna 110-1, 110-2 and may be mounted on a substrate (not shown). The substrate is a single layer material, which may be a single metal layer or any appropriate integrated circuit mounting material, such as a printed circuit board (PCB), silicon, flexible printed circuits (FPC), low temperature co-fired ceramic (LTCC), polyethylene terephthalate (PET), Polyimide (PI), paper, and the like.

In an example embodiment, wireless tag 100 includes a pair of antennas 110-1 and 110-2 that are etched within the inlay 105. First antenna 110-1 is utilized to harvest energy from ambient RF signals and second antenna 110-2 is utilized to communicate, e.g., transmit and receive, signals, such as Bluetooth Low Energy (BLE) signals. Each antenna 110-1, 110-2 may be of a type including a loop antenna, a big loop with two feeds, a dipole antenna with two transformer feeds, and similar configurations. It should be noted that transmitting second antenna 110-2 may be utilized to harvest energy as well. Further, in some configurations, a plurality of antennas may be used to harvest energy, each of which is designed to receive signals of different frequencies.

In an embodiment, wireless tag 100 also includes capacitor 130 that may be realized as an on-die capacitor, an external passive capacitor, and the like. The energy harvesting functionality and energy use is under the direction of the integrated circuit 120. In another embodiment, wireless tag 100 may include a printed battery.

In order to ensure that wireless tag 100 can operate accurately it needs to be tested to ensure that it is capable of receiving signals, harvesting energy, charging a capacitor, and transmitting signals.

Harvesting first antenna 110-1 of wireless tag 100 receives energy over RF signals at one or more frequency bands. Such bands are specific to the parameters of that wireless tag, which include, but are not limited to, physical parameters such as antenna length, thickness, conductivity, resistivity, and antenna properties, such as gain, radiation pattern, beam width, polarization, impedance, and the like. It should be noted that even minute differences or shifts between the parameters of two antennas may result in a different harvesting frequency.

Based on the harvesting frequency, harvesting first antenna 110-1 of wireless tag 100 is tuned to a frequency band where the wireless tag can most efficiently receive and transform RF signals received over that band into a DC voltage. In an embodiment, the DC voltage is stored on capacitor 130, or on a similar power storage device.

The energy E on capacitor 130 is related to the DC voltage V by the following equation:

$$E = \frac{1}{2}CV^2,$$

where C is the capacitance of the capacitor. As discussed above, the inlay 105 of wireless tag 100 may include multiple antennas, where more than one antenna may be configured as a separate harvester. In an embodiment, each harvester is connected to a separate storage capacitor, while in a further embodiment, a single storage capacitor is common to multiple harvesters, allowing for an increased shared storage capacity for wireless tag 100.

Bluetooth® and Bluetooth low energy (BLE) are personal area network protocols that support wireless connectivity over the 2.4 GHz industrial, scientific and medical (ISM) band to distances even more than 250 meters. A BLE signal is used with low power consumption devices, such as battery-fewer wireless tags, e.g., wireless tag 100. Bluetooth and Bluetooth low energy communication operate in far field and their protocol can support multiple connections and multiple device connectivity at the same time. Other low energy communication protocols include LoRa, nRF, DECT® Ultra Low Energy (DECT ULE), Zigbee®, Z-Wave®, EnOcean®, and the like can be used for wireless tags in a similar manner to Bluetooth and BLE. For simplicity and pedagogical purposes, this disclosure may use BLE as an illustrative example, although the disclosure is applicable to wireless tags and testers that employ such other low energy communication protocols.

Some BLE devices may include an Advanced RISC Machines (ARM) processor, e.g., IC 120, with at least one or more antennas, e.g., antennas 110, patterned or designed for transmitting (TX) and receiving (RX) data via radio frequency (RF) communication signals. Additional one or more antennas and other components may be included for use in harvesting energy, e.g., RF energy harvesting, to power the wireless tag's operation. In other configurations, one or more antennas can be used for both harvesting and TX and/or RX. Energy harvesting may allow a wireless tag to operate without requiring a battery source or other external power supply by using over-the-air signals to charge a capacitor.

IC 120 further contains firmware or has access to storage for storing program code and data. Such firmware or program code is hereinafter referred to simply as code.

In some embodiments, BLE low-cost devices, e.g., wireless tag 100, are initially implemented on reels or a web, very similar to what is commonly used in radio frequency identification (RFID) tags, so that there are multiple wireless tags arranged as an array. The array may be one dimensional, e.g., a vector, or, more typically, as a matrix, e.g., two dimensional. The BLE wireless tag's substrate are usually made of PET, PI, or other flexible material and each antenna, e.g., antenna 110, is commonly applied/made with copper, aluminum, or silver metals.

For purposes of this disclosure and pedagogical clarity, it will be assumed henceforth that the wireless tags are on a reel and have a two-dimensional matrix arrangement.

Figure 3:
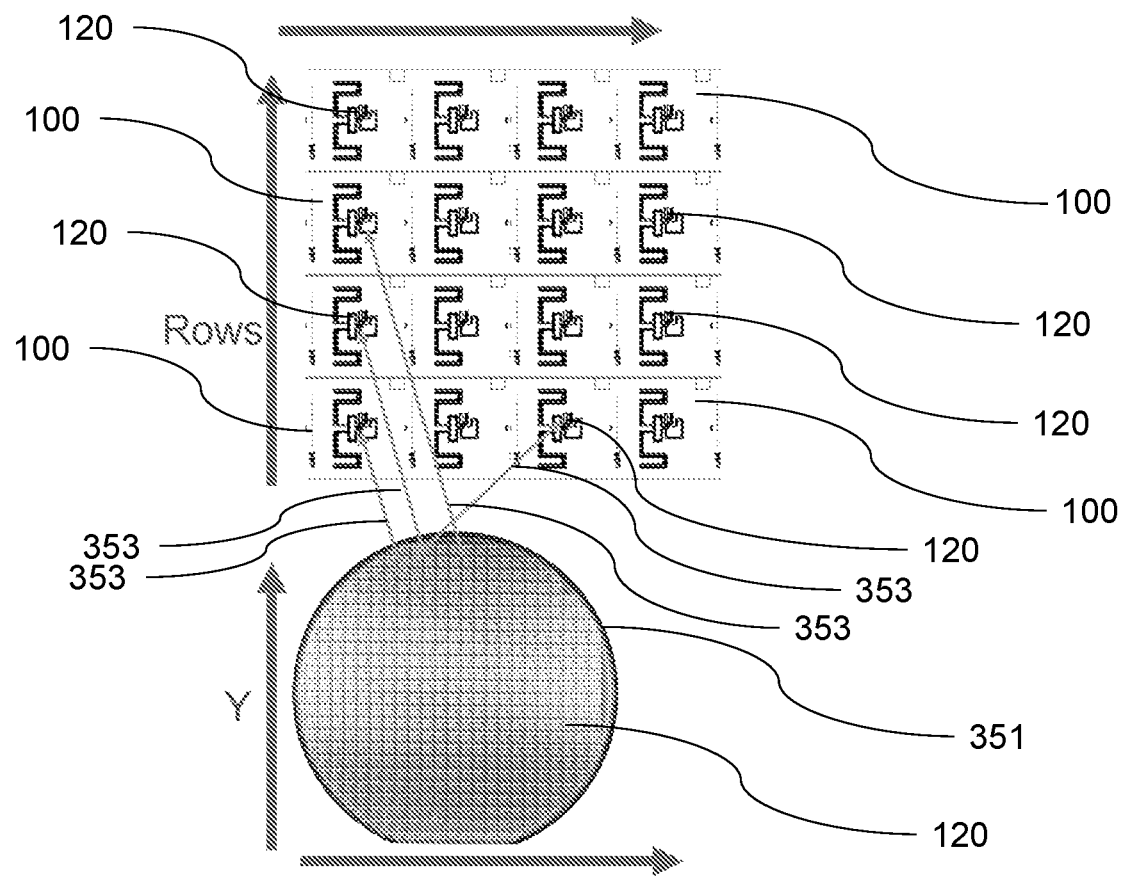
FIG. 3 shows a wafer including multiple ICs or dies arranged in a matrix and also shows dies placed on substrates of wireless tags.

As part of the manufacturing of each wireless tag 100, each IC 120 when manufactured is initially part of a wafer that is made up of many ICs and each IC is called a die. FIG. 3 shows wafer 351 including multiple ICs or dies 120 arranged in a matrix. Each IC 120 is programmed with a unique identifier (ID), by burning the ID into the firmware of each respective IC 120. A record is made of the location of each die on the wafer and the unique ID assigned thereto. The location of each die in the wafer may be represented as an X,Y coordinate pair. This record may be stored locally or in the cloud. As a result, the unique ID of each die can be mapped to the die's location in the array and vice-versa.

Next, a pick and place machine, which, as is well-known, is a robotic machine that is are used to place surface-mount devices onto a surface such as a printed circuit board at a prescribed position, is employed to take each die 120 from wafer 351 and place it on the substrate of one of wireless tags 100. In this case, the substrate may be considered to be an antenna web, as it contains already at least one preprinted antenna for use by the wireless tag. The placement of several ones of IC 120 are indicated by arrows 353.

Thus, amongst various other processes, assembly of the wireless tags may include attaching each die 120, e.g., using Anisotropic Conductive Paste (ACP), to the antennas on the substrate of a wireless tag 100.

The location of each die 120 in the matrix is recorded so that there is a correspondence between the location of each die 120 in the matrix and its location originally in the wafer. It is thus possible to obtain the unique ID for each die 120 in the matrix by translating from a location in the matrix, e.g., using a lookup, to a location in the wafer and hence to a unique ID.

Figure 4:
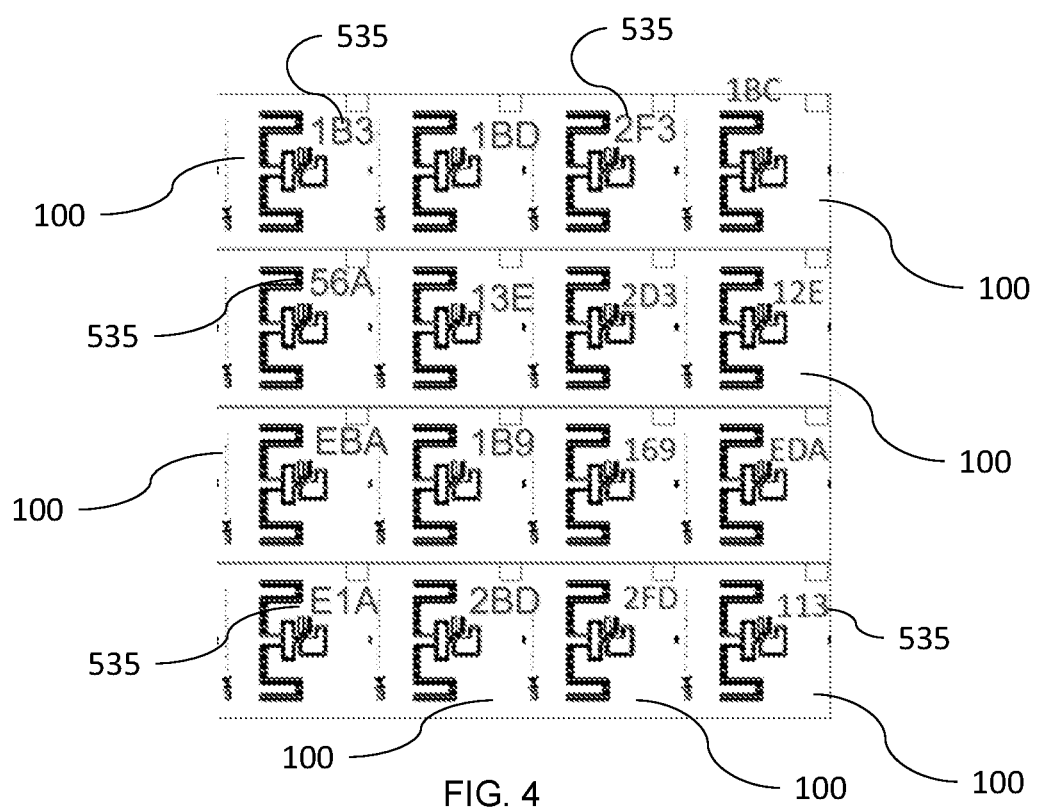
FIG. 4 shows an array of wireless tags arranged in a matrix as in FIG. 3 and also shown for each wireless tag is its unique identifier.

FIG. 4 shows an array of wireless tags 100 arranged in a matrix as in FIG. 3 and also shown for each wireless tag 100 is its unique identifier 435. As noted, wireless tags 100 may be part of a tape or on a belt. Note that FIG. 4 shows the number of columns that fit in the pick and place machine in one illustrative embodiment. Of course, in various embodiments, this number may be different than that shown in FIG. 4, as it depends on the particular implementation of the pick and place machine. Note, too, that this number of columns may be different than the number of columns that can be accommodated by tester 200. The location of each die in the matrix may also be represented as an X,Y coordinate pair, where X is the row number and Y is the column number. Typically, the range of X will be fixed to the number of rows in the matrix, e.g., 4 in FIGS. 3-5, while the number of columns will depend on the length of the tape or belt that includes the wireless tags.

Which wireless tags are in the tester may be determined based on knowing at least one wireless tag that is in the first column to enter tester 200. From that all wireless tags in the column and subsequent columns can be determined from the recorded information. It only remains to keep track of the movement of the wireless tag columns through tester 200.

In another embodiment, the pick and place machine prints a column number on at least one wireless tag in the matrix of wireless tags of a size that will fit in the testing area. Based on that, which wireless tags are in the tester can be determined since their location is known from the pick and place machine. This enable the testers to use machine vision to recognize which columns are in the matrix that is in the testing area. The column numbers may be universally unique or unique per web.

Figure 2:
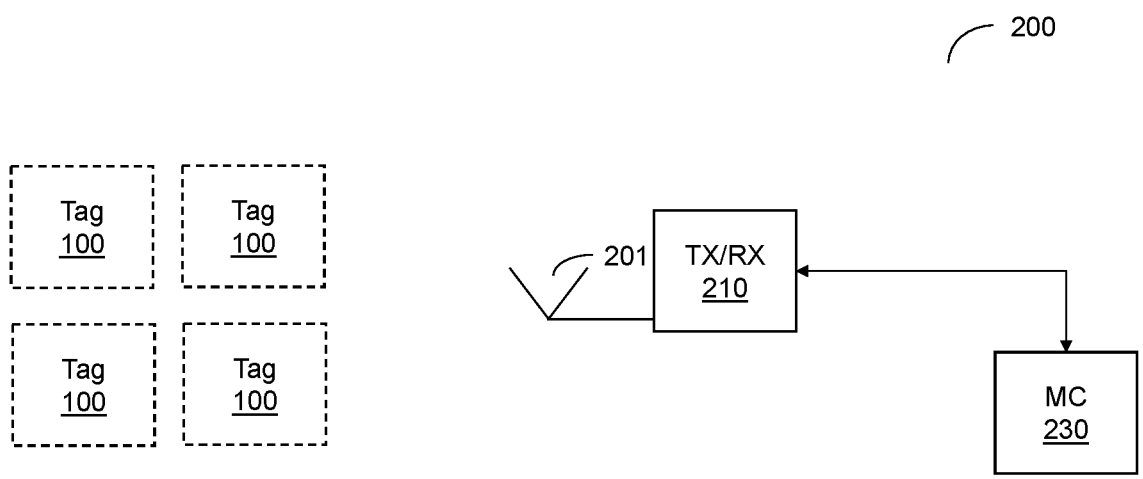
FIG. 2 shows a schematic diagram of a tester configured to test the functionality of a wireless tag, e.g., the wireless tag of FIG. 1, in accordance with an embodiment.

FIG. 2 shows a schematic diagram of tester 200 configured to test the functionality of a plurality wireless tag, e.g., wireless tag 100, in accordance with an embodiment. The tested wireless tags e.g., wireless tag 100, may be battery-free wireless tags which perform energy harvesting, e.g., harvesting energy from wireless signals impacting thereon, as noted above.

Tester 200 is configured to determine if each of a plurality of wireless tags 100 that are within a testing area of tester 200 operate as expected. Tester 200 may be integrated within a machine that assembles wireless tags or performs other manufacturing processes thereon.

Tester 200 includes transmitter/receiver (TX/RX) 210 connected to far field antenna 201. TX/RX 210 is further connected to microcontroller (MC) 230.

TX/RX 210 is configured to transmit signals to the plurality of wireless tags 100 via antenna 201. Each of wireless tags 100 is configured to use at least some of the transmitted signals to charge a capacitor, e.g., capacitor 130, using its harvesting antennas. The signals transmitted by TX/RX 210 may include any wireless signals that the wireless tag can receive, and may include wireless signals such as BLE®, FM radio, cellular, Bluetooth®, LoRa, Wi-Fi®, nRF, DECT®, Zigbee®, Z-Wave®, EnOcean®, and the like. In one embodiment, the signals that each wireless tag 100 may harvest need not be of the same type that it uses for communication.

TX/RX 210 may be configured to transmit multiple different signals, e.g., a BLE signal and an FM radio signal, simultaneously to wireless tag 100, e.g., to charge wireless tag 100 using its various harvesting antennae. Where TX/RX 210 is configured to transmit signals at different bands, TX/RX 210 may operate in accordance with instructions received from microcontroller 230 indicating which type of signal is to be transmitted to the wireless tags 100, and the timeframe in which they are transmitted.

Wireless tags 100 are manufactured at a mass-production level, thus requiring that the testing of such wireless tags be performed accurately at scale within acceptable time constraints.

As is well known, for example, the Bluetooth LE specification divides the communication bandwidth employed into 40 channels of 1 MHz spaced 2 MHz apart starting at 2400 MHz. Of these channels three are called "advertising" channels and are used by devices exclusively to send beaconing packets called advertising packets. These packets contain information that allow other devices to connect, and they can also provide information about a device. The advertising channels in BLE are channels 37, 38, and 39, i.e., CH37, CH38, and CH39. In conventional operation, an advertiser transmits three identical ADV_IND BLE packets sequentially over channels CH37, CH38, and CH39. This is called an advertising event which is referred to as advEvent. In response, a wireless tag will transmit a message that includes its unique ID.

As will be readily understood by those of ordinary skill in the art, in order to operate a battery-less wireless tag must be charged, i.e., energized. Even wireless tags with batteries may require some degree of charging, e.g., to provide sufficient power for operation such as when the battery has a small capacity or to recharge the battery. In one illustrative embodiment, energy at around 2480 MHz may be used to energize the wireless tag so that it can operate. In another embodiment with two different harvesters, the energy around 2480 MHz may be used in charging by one harvester and energy around 915 MHz may be used by the other harvester. In some embodiments the transmitted beacons may also function to energize the wireless tag.

In some embodiments, because the wireless tag may be a battery-less, at least sometimes, e.g., every time, during conventional operation, when the wireless tag wakes up, e.g., from a completely off state, the wireless tag must calibrate itself. Thus, when the wireless tag wakes up it may have to perform calibration. This is done typically at least when the wireless tag goes from completely off to on. If the wireless tag was in retention mode, the wireless tag may not need to perform calibration again but instead may employ previously stored calibration values. Nevertheless, the wireless tag may perform calibration periodically to take into account any changes in the environment.

Generally, so long as a proper expected response is timely received by tester 200 from a one of wireless tags 100 under test, that wireless tag 100 is considered to be good and it proceeds to the next manufacturing step. However, when a proper expected response is not timely received by tester 200 from a particular wireless tag 100 under test, the wireless tag 100 is considered to be bad and is slated to be discarded.

In some embodiments, prior to initiating transmitting on each frequency, the wireless tag may calibrate its transmitter to the particular frequency on which it is going to transmit. This is part of the calibration mentioned hereinabove and must be successfully completed for the wireless tag to be considered operational.

Figure 5:
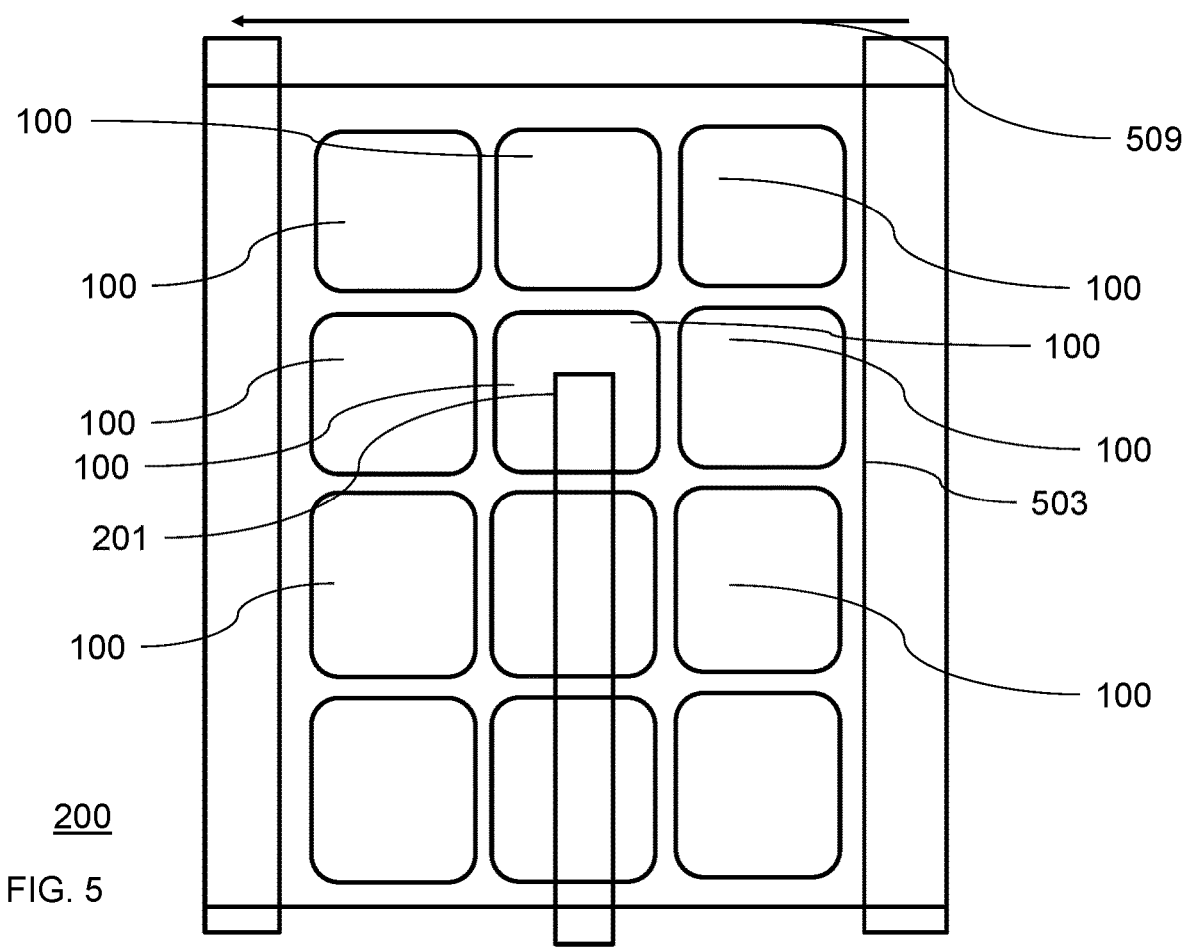
FIG. 5 shows another view of an illustrative embodiment of the tester of FIG. 2 in accordance with an embodiment.

FIG. 5 shows another view of an illustrative embodiment of tester 200 in accordance with an embodiment. In the embodiment of FIG. 5 tester 200 transmits appropriate signals, e.g., as described above, from far field antenna 201 to cause each wireless tag 100 that passes within range of antenna 201 to energize and prepare to transmit a response signal including its unique ID. During the testing, antenna 201 may be over or under IotT wireless tags 100. In one embodiment, the far field antenna, e.g., antenna 201, is located "above" the matrix of wireless tags 100 in the middle of the testing area.

In the embodiment of FIG. 5, wireless tags 100 are arranged as an array or matrix, and they may be part of a tape or on a belt (not shown) with other wireless tags 100 that are all movable in the direction indicated by arrow 509. The arrangement of the array as well as how many wireless tags may be in the testing area at one time are at the discretion of the implementer. However, it should be appreciated that, in some embodiments, e.g., as shown in FIG. 5, the number of columns that can be accommodated within the testing area of tester 200 may be different than the number of columns that could be handled in the placement area of the pick and place machine that placed the dies 120 on the wireless tags 100, as noted hereinabove with regard to FIG. 4. For example, as shown in FIGS. 3 and 4, the pick and place machine accommodated four columns while, e.g., as shown in FIG. 5, tester 200 only accommodates three columns.

Because the testing is being done using the far field, in one embodiment, the testing may be performed in a shielded environment. Openings may be made in the chamber formed by the various shielding portions such that radio waves can pass between far field antenna 201 and wireless tags 100 to which the antenna is transmitting and receiving from. In some embodiments, a conveyor belt, if employed, is not conductive so as to minimize interference of the communication between far field antenna 201 and each wireless tag 100. A controller (not shown in FIG. 5) may synchronize the movement of wireless tags 100 and the testing process, e.g., the signals transmitted by and expected to be received by antenna 201.

In another embodiment, the testing need not be performed in a shielded environment because the tester knows which of wireless tags are in the testing area and so it can ignore any transmission from other wireless tags not in the testing area as such other wireless tags are not being tested.

Each wireless tag 100 enters the testing area when it crosses boundary 503 and is thus expected to receive signals from antenna 201. It may take hundreds of milliseconds to bring a wireless tag up to power and perform a full calibration.

In accordance with one implementation of the embodiment shown in FIG. 5, all of wireless tags 100 may be charged and calibrated substantially simultaneously. This may reduce the testing time required to collectively test all of wireless tags 100 within the testing area with respect to the prior art since only one charging and calibration time may be required to have the wireless tags 100 that are in the testing area transmit as opposed to having each wireless tag 100 require its own charging time.

In accordance with another implementation of the embodiment shown in FIG. 5, antenna 201 constantly transmits a pattern of beacon and then there is a quiet period, i.e., a period where antenna 201 does not transmit, so the wireless tags have many opportunities to power up and calibrate and also many opportunities to transmit. Those of IoT wireless tags 100 that are furthest from the entrance into the testing area once all wireless tags 100 have entered the testing area have had the most opportunity to charge, calibrate, and transmit. Therefore, they are likely to be the ones to complete calibration and transmit a response first, thus possibly minimizing the number of collisions in the response. Since the signals to cause a response from the wireless tags are transmitted in a repetitive manner, there is no loss in regard to wireless tags 100 that enter the testing area later.

A set of wireless tags 100 are moved into the testing area of tester 200. Once the set of wireless tags 100 that fill the testing area of tester 200 are in the testing area the wireless tags may cease moving for a prescribed period. Antenna 201 transmits signals to energize wireless tags 100 that fill the testing area of tester 200. As noted above, the signals may be repetitively transmitted, and hence their transmission may start once the first column of wireless tags 100 of the set enter the testing area.

Those wireless tags that are good perform their calibration and attempt to transmit a response. To this end, in one embodiment, a wireless tag in preparing to respond, first assesses the condition of the channel. When a wireless tag makes an assessment that the channel is clear, e.g., it senses the channel and does not detect energy on the channel above a prescribed threshold, it transmits its response including a version its unique ID. If the channel is not clear, the wireless tag waits a certain amount of time, e.g., based on a timer, and then repeats the process of checking the channel again. Eventually all of the wireless tags that are properly operational, i.e., good, will transmit a signal that includes a version of its unique identifier (ID).

In some embodiments, the version of the unique ID is an encrypted version of the unique ID. When the version of the unique ID is an encrypted version of the unique ID, the encrypted ID may be decrypted by another system to which the encrypted version of the unique ID is transmitted. Such other system may be remote from the tester, e.g., another computer or the cloud. The remote system returns the decrypted ID to the tester. The tester then employs the mapping of the decrypted unique ID to the wafer location and then the mapping of the wafer location to the matrix location to determine where the wireless tag is located in the testing area of tester 200.

In another embodiment the wireless tags may transmit first and then detect if there is a collision, e.g., use an ALOHA-type protocol.

The tester receives such transmitted signals, if any, from the wireless tags.

In one embodiment, where the unique IDs are not transmitted in an encrypted form, tester 200 may set about determining what are the unique ID numbers of the wireless tags within the testing area, i.e., the unique ID numbers of the particular wireless tags that make up the set once the wireless tags that make up the set enter the testing area. To this end, tester 200 obtains an indication which enables it to determine the location of each die 120 in the matrix as determined by the pick and place machine. Using each location, tester 200 is able to use the recorded correspondence between the location of each die 120 in the matrix and its original location in the wafer. Knowing the location in the wafer, the unique ID can then be retrieved based on the record that was made of the location of each die on the wafer and the unique ID that was assigned thereto.

The wireless tags are maintained in the testing area sufficiently long so that all of the wireless tags will have an opportunity to respond and transmit their ID. The tester may compare the received IDs to the IDs of the wireless tags known to be in the set and declare those for which an ID has been received good and those for which an ID has not been received bad. Because the tester knows the location of the wireless tag corresponding to each ID, the tester can mark those wireless tags for which a valid response with an ID was received as good. In one embodiment this may be done by having the tester print an indication that the good wireless tags are good on the good wireless tags. In another embodiment, a file specifying the location of the good wireless tags may be created. This may be used to ensure that the good wireless tags are kept.

Similarly, because the tester knows the location of the wireless tag corresponding to each ID, and hence which wireless tags are in the set altogether, the tester can mark as bad those wireless tags for which a valid response with an ID was not received. In one embodiment this may be done by having the tester print an indication that the bad wireless tags are bad on the bad wireless tags themselves. In another embodiment, a file specifying the location of the bad wireless tags may be created and used to later discard the bad wireless tags.

Figure 6:
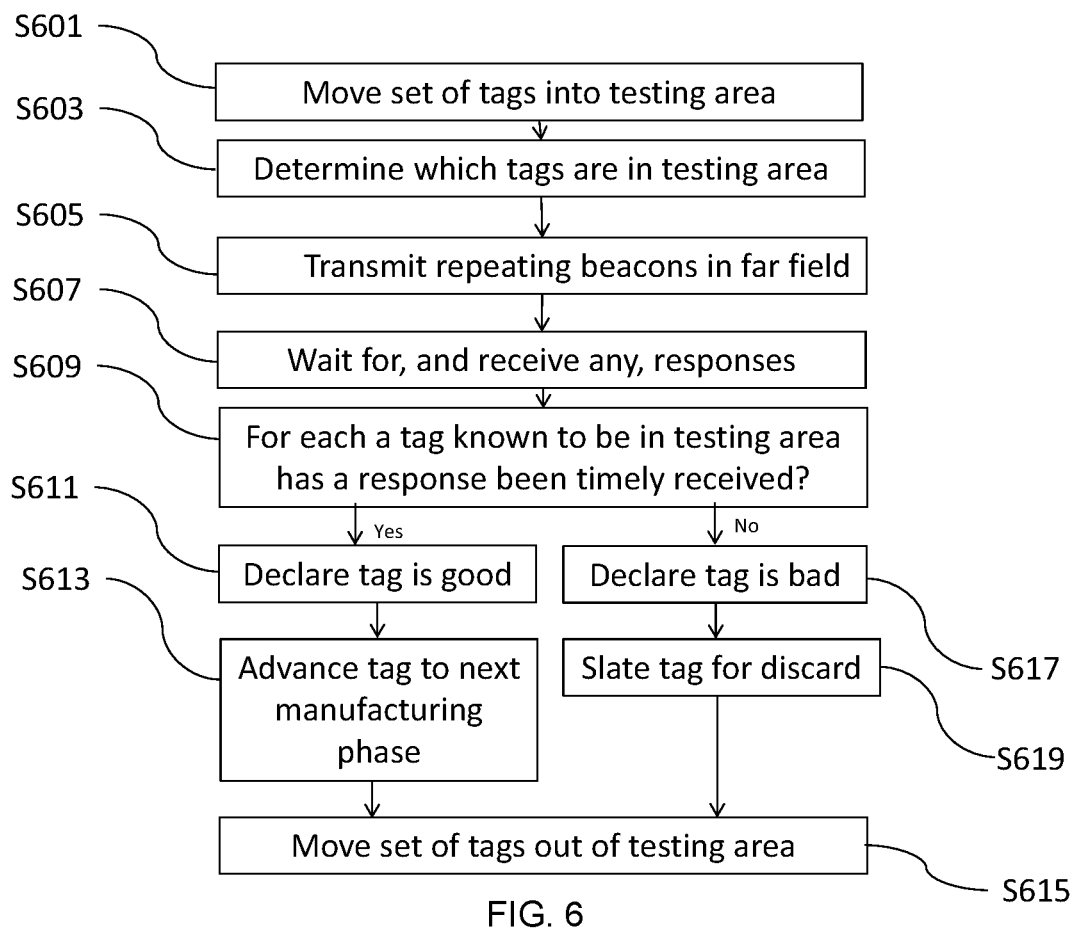
FIG. 6 shows an illustrative process in flowchart form for testing by a tester a set of wireless tags.

FIG. 6 shows an illustrative process in flowchart form for testing a set of wireless tags by a tester, e.g., an embodiment of tester 200, the process being performed by the tester.

The process is entered in S601 when a set of wireless tags, e.g., a set of wireless tags 100, is moved into the testing area, e.g., within range of the antenna of the tester. For example, the wireless tags may be brought with range of antenna 201 of tester 200 (FIG. 3). Such may be achieved by moving a conveyor belt or a tape of wireless tags. Once the set of wireless tags 100 that fill the testing area of tester 200 are in the testing area the wireless tags may cease moving for a prescribed period.

Then, in S603, the tester determines which wireless tags 100 are in the set, i.e., the unique IDs of the wireless tag in the set. This is based on the recorded location of each die 120 in the matrix and using the correspondence between the location of each die 120 in the matrix and its location originally in the wafer. It is thus possible to obtain for each die 120 in the matrix in the tester by translating from a location in the matrix, e.g., using a lookup, to a location in the wafer and hence to a unique ID. Machine vision may be employed to help determine which columns are in the matrix that is in the testing area, e.g., by reading at least one column number that was printed on at least one wireless tag in the matrix by the pick and place machine.

Thereafter, in S605, repeating beacons are transmitted by the tester in far field. For example, the repeating beacons may be transmitted by antenna 201 of tester 200 (FIG. 5). The transmission of the beacons is alternated with quiet periods so the wireless tags have opportunities to transmit.

Next, the tester waits for and receives any, responses from the wireless tags in S607. This waiting is performed in one embodiment for a prescribed time. In another embodiment the waiting is ended earlier than the end of the prescribed time if a response is received from all wireless tags known to be in the tester.

Conditional branch point S609 is executed at the conclusion of the waiting in S607 and tests to determine if for each a wireless tag known to be in testing area a timely response has been received, e.g., via antenna 201.

If test result in S609 is YES, then for each wireless tag for which a valid response was timely received, control passes to S611 in which the wireless tags for which a valid response was timely received are declared to be good. Control then passes to S613 in which the wireless tags are slated for the next manufacturing phase. This may be achieved by marking a record for each such wireless tag that in a memory of the tester. In addition, it is possible that the testing unit has printing capability and may print a visual indication of pass or failure on each of the wireless tags themselves as appropriate and if such is desired. This next phase may be, for example, conversion. Control then passes to S615, which is only executed once steps 617 and 619 have been executed when there are wireless tags of the set for which a valid response was not received, and the set of wireless tags is move out of the testing area.

If test result in S609 is NO, indicating that for at least some of the wireless tags of the set a valid response was not timely received, control passes to S617 in which each such wireless tag is declared to be bad. Control then passes to S619 in which such wireless tags are slated to be discarded. This may be achieved by marking a record for the wireless tags to be discarded in a memory of the tester. Control then passes to S615, which is only executed once steps 611 and 613 have been executed when there are wireless tags of the set for which a valid response was received, and the set of wireless tags is move out of the testing area.

Figure 7:
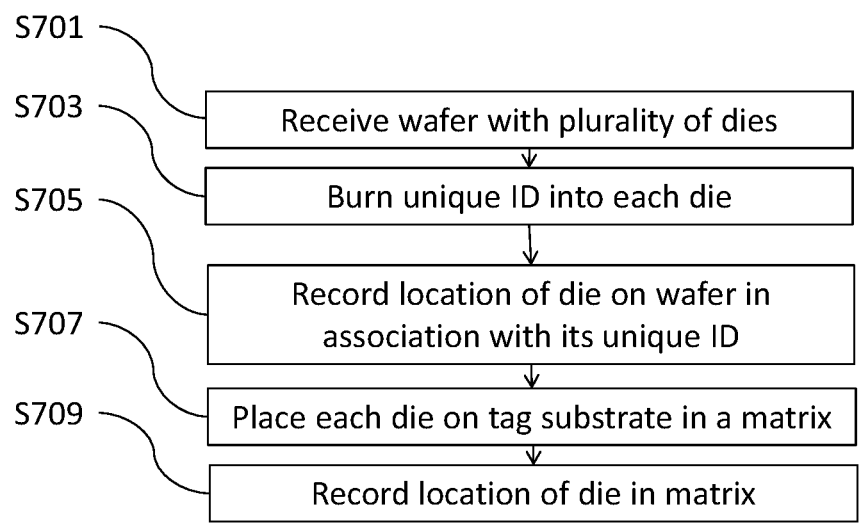
FIG. 7 shows an illustrative process in flow chart form for establishing a relationship between the location of a die in the matrix and its unique ID.

FIG. 7 shows an illustrative process in flow chart form for establishing a relationship between the location of a die in the matrix and its unique ID.

The process begins in S701 when a wafer with a plurality of dies is received. In S703, a unique ID is burned into each die.

Next, in S705, the location of the die on the wafer is recorded in association with the unique ID that was burned therein. A pick and place machine then places each die on a wireless tag substrate in a matrix in S707. The location in the matrix where each wireless tag is placed is recorded in S709.

Figure 8:
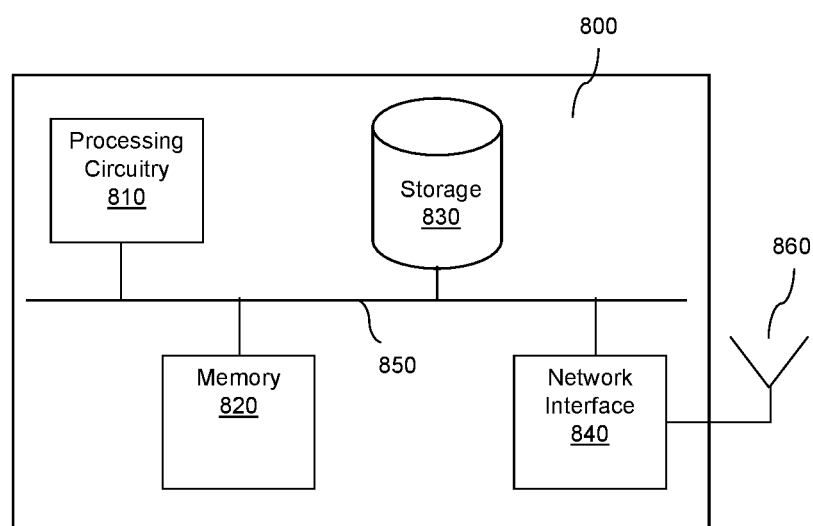
FIG. 8 is a more detailed diagram of an illustrative arrangement that can be used to implement the controller of a tester or of a wireless tag.

FIG. 8 is a more detailed diagram of an illustrative arrangement 800 that can be used to implement the controller of a tester, e.g., MC 230 (FIG. 2) or of a wireless tag, e.g., IC 120 (FIG. 1). Arrangement 800 includes a processing circuitry 810 coupled to memory 820, storage 830, and network interface 840 at least coupled to antenna arrangement 860. In an embodiment, the components of arrangement 800 may be communicatively connected via bus 850.

Processing circuitry 810 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information. Processing circuitry 810 may implement at least in part integrated circuit 120 (FIG. 1) when the arrangement of FIG. 8 is part of a wireless tag, e.g., wireless tag 100, and MC 230 (FIG. 2) when the arrangement of FIG. 8 is part of a tester.

Memory 820 may be volatile, e.g., RAM, etc., non-volatile, e.g., ROM, flash memory, etc., or a combination thereof. In one configuration, computer readable instructions to implement one or more embodiments disclosed herein may be stored in storage 830.

In another embodiment, memory 820 is configured to store software. Software shall be construed broadly to mean any type of instructions, whether referred to as software, firmware, middleware, microcode, hardware description language, or otherwise. Instructions may include code, e.g., in source code format, binary code format, executable code format, or any other suitable format of code. The instructions, when executed by processing circuitry 810, cause processing circuitry 810 to perform the various processes described herein. Specifically, the instructions, when executed, cause processing circuitry 810 to create, generate, and manage operation of a wireless tag or a tester as described hereinabove.

Storage 830 may be magnetic storage, optical storage, and the like, and may be realized, for example, as flash memory or other memory technology, CD-ROM, Digital Versatile Disks (DVDs), or any other medium which can be used to store the desired information. Storage 830 may be optional.

Network interface 840 allows a tag or a tester, when implemented by arrangement 800, to communicate with other elements, which are external to arrangement 800. Network interface 840 may include a radio frequency module for use in communicating wirelessly via antenna arrangement 860, which may include one or more antennas. Network interface 840 may also interface with other components, e.g., components moving the wireless tags or controlling the position of the wireless tags or to change the location of an antenna, when arrangement 800 is employed to implement a tester.

Antenna arrangement 860 represents whatever antenna architecture is implemented for a wireless tag or a tester. It may be one antenna or more than one antenna, e.g., as described above. Antenna arrangement 860 primarily represents one or more antennas used for wireless communications but it does not preclude using any of its antennas for energy harvesting or to provide energy for energy harvesting. Although not shown in arrangement 800, arrangement 800 may include additional antennas and circuitry for energy harvesting.

It should be understood that the embodiments described herein are not limited to the specific architecture illustrated in FIG. 8, and other architectures may be equally used without departing from the scope of the disclosed embodiments.

The various embodiments disclosed herein can be implemented as hardware, firmware, software executable on hardware, or any combination thereof. Moreover, the software is preferably implemented as an application program tangibly embodied on a program storage unit or computer readable medium consisting of parts, or of certain devices and/or a combination of devices for execution by hardware. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

The invention claimed is:

1. A method for testing wireless tags by a testing unit, comprising:
   transmitting a signal to energize a plurality of wireless tags known to be within a testing area of the testing unit substantially simultaneously, wherein information as to the identity of which wireless tags are in the testing area is known to the testing unit without requiring any transmission by any tag of the plurality of wireless tags while the plurality of wireless tags are in the testing area;
   waiting a prescribed amount of time sufficient to allow all of the wireless tags in the testing area an opportunity to respond with a transmitted message, each transmitted message including a unique identifier of the wireless tag;
   determining, based on the information as to the identity of which wireless tags are in the testing area and receipt, if any, by a testing unit of the transmitted messages containing respective unique identifiers from the wireless tags in the testing area, which of the plurality of wireless tags are good and which of the plurality of wireless tags are bad.

2. The method of claim 1, wherein the unique identifiers are encrypted, further comprising decrypting the encrypted unique identifiers.

3. The method of claim 2, wherein decrypting the encrypted unique identifiers further comprises transmitting the encrypted unique identifiers to a system remote from the testing unit.

4. The method of claim 1, wherein the signal to energize the plurality of wireless tags is transmitted in the far field.

5. The method of claim 1, wherein the signal to energize the plurality of wireless tags is repeatedly transmitted in a pattern alternating with a period of time of quiet to allow for transmission by the wireless tags.

6. The method of claim 1, wherein a wireless tag of the plurality of wireless tags is determined to be good when a transmitted message is received from the wireless tag within the prescribed amount of time.

7. The method of claim 1, wherein a wireless tag of the plurality of wireless tags is determined to be bad when a transmitted message is not received from the wireless tag within the prescribed amount of time.

8. The method of claim 1, further comprising ascertaining which wireless tags are in the plurality of wireless tags.

9. The method of claim 1, wherein at least a portion of the information as to the identity of which wireless tags are in the testing area is supplied by a pick and place machine, the portion of the information relating a location on a wafer of each die to a location in a matrix of substrates of wireless tags on which each die is placed by the pick and place machine, the wafer location of each die being associated with the unique identifier of the die.

10. The method of claim 1, further comprising printing by the testing unit an indication that a wireless tag is good on a wireless tag that is determined to be good.

11. The method of claim 1, further comprising printing by the testing unit an indication that a wireless tag is bad on a wireless tag that is determined to be bad.

12. The method of claim 1, wherein the wireless tags of the plurality are arranged in a matrix and wherein information as to the identity of which wireless tags are in the testing area is ascertained by translating a location in the matrix of at least one wireless tag to a location in a wafer at which the at least one wireless tag originated.

13. The method of claim 1, wherein at least one wireless tag in the testing area is identified using machine vision of an indication printed on the at least one wireless tag.

14. The method of claim 1, further comprising moving the plurality of wireless tags into the testing area.

15. A method for testing wireless tags by a testing unit, comprising:
determining which, if any, of a plurality of wireless tags in a testing area are good based on received responses from none or more of the wireless tags of the plurality in response to at least one energizing signal transmitted in the testing area and knowledge of which wireless tags make up the plurality of wireless tags in the testing area, such knowledge being obtained by the testing unit without requiring any transmission by any tag of the plurality of wireless tags while the plurality of wireless tags are in the testing area.

16. The method of claim 15, wherein the energizing signal is transmitted in the far field to be received by all the wireless tags of the plurality substantially simultaneously.

17. The method of claim 15, wherein the energizing signal is transmitted repeatedly in a pattern alternating with a period of time of quiet to allow for transmission by the wireless tags.

18. The method of claim 15, wherein further comprising determining which, if any, of the plurality of wireless tags in the testing area are bad based on the received responses from none or more of the wireless tags of the plurality in response to the at least one energizing signal and knowledge of which wireless tags make up the plurality of wireless tags in the testing area.

19. The method of claim 15, further comprises:
moving the plurality of wireless tags into the testing area;
waiting a prescribed amount of time sufficient for each the wireless tags to respond to the at least one energizing signal with a transmitted message each transmitted message including a unique identifier of the wireless tag;
determining, based on information as to the identity of which wireless tags are in the testing area and receipt, if any, by a testing unit of the transmitted messages containing respective unique identifiers from the wireless tags in the testing area which of the plurality of wireless tags are good and which of the plurality of wireless tags are bad, wherein the information as to the identity of which wireless tags are in the testing area is part of the knowledge of which wireless tags make up the plurality of wireless tags in the testing area.

20. The method of claim 15, wherein each received response include a unique identifier for those of the plurality of wireless tags that transmitted a response, each unique identifier being translatable into a location in a matrix in which the plurality of wireless tags are arranged.

21. The method of claim 15, wherein each received response includes an encrypted version of a unique identifier for those of the plurality of wireless tags that transmitted a response, each unique identifier being translatable into a location in a matrix in which the plurality of wireless tags are arranged, the method further comprising:
transmitting each encrypted version of the unique identifier to a remote system; and
receiving a decrypted version of each transmitted encrypted version of the unique identifier.

22. The method of claim 15, wherein at least a portion of the knowledge of which wireless tags make up the plurality of wireless tags in the testing area is based on information supplied by a pick and place machine, the portion of the information relating a location on a wafer of each die to a location in a matrix of substrates of wireless tags on which each die is placed by the pick and place machine, the wafer location of each die being associated with the unique identifier of the die.

* * * * *